United States Patent Office 3,073,873
Patented Jan. 15, 1963

3,073,873
PROCESS FOR PREPARING TETRASUBSTITUTED BUTADIENES AND RELATED OLEFINS
Boris Franzus, Linden, N.J., and Ray A. Wickliffe, Dewey, Okla., assignors to Phillips Petroleum Company, a corporation of Delaware
No Drawing. Filed Sept. 6, 1960, Ser. No. 53,920
13 Claims. (Cl. 260—668)

This invention relates to a process for preparing tetrasubstituted butadienes and related olefins. In one aspect this invention relates to a method for reacting a disubstituted acetylene with an organometal compound and recovering a tetrasubstituted butadiene and a related olefin.

Heretofore, the need for tetrasubstituted conjugated dienes and related olefins has been confined to limited amounts used for theoretical studies and have been considered as by-products from other or primary reactions. However, with the development of certain synthetic resins, particularly polyolefins such as polypropylene, considerable attention has been directed to methods for improving these polymers, particularly certain physical properties generally characterized by increased isotactic content. It has recently been disclosed in the prior art that the utilization of adjuvant materials along with heterogenes initiators serves to enhance the isotactic content of polypropylene or the like over that obtained when using the initiator alone. Among the proposed adjuvant materials are compounds such as alpha-alkyl stilbenes, and similar compounds. The present invention provides a convenient procedure for synthesis of materials useful in such applications.

We have now discovered a process for preparing a tetrasubstituted butadiene and a related olefin wherein both of these compounds are produced by the single interaction of two readily available compounds.

It is an object of this invention to provide an improved method for preparing tetrasubstituted conjugated dienes, such as tetrasubstituted butadienes.

It is another object of this invention to provide an improved process for preparing olefins.

Yet another object of this invention is to provide an improved process for preparing tetrasubstituted butadienes and related olefins.

It is another object of this invention to provide an improved process for the interreaction of disubstituted acetylenes and organometals.

Yet another object of this invention is to provide an improved process for the production of 1,2,3,4-tetraphenylbutadiene and alpha-ethyl-cis-stilbene.

These an other objects and advantages of the invention will be apparent to those skilled in the art upon consideration of the accompanying disclosure and claims.

These objects are broadly accomplished by the method of this invention by contacting a disubstituted acetylenic compound under reaction conditions with at least one organometal as described hereinbelow.

In one aspect of the invention the reaction mixture is treated with a material suitable for deactivating the organometal compound so as to prevent further polymerization and which will not react with the mixture at the termination of the reaction period. Suitable treating agents include water, alcohol and other known organometal deactivators.

The reactants employed in this invention comprise a disubstituted acetylene and at least one organometal compound. The disubstituted acetylenic compounds employed comprise compounds having the general formula

wherein R is an alkyl, cycloalkyl or aryl group and the total number of carbon atoms per molecule in the R groups is between 2 and 32. It is to be understood that the R's can be identical or different in each molecule. Examples of suitable disubstituted acetylenes include diphenylacetylene, dimethylacetylene, methyl-n-propylacetylene, methyl-n-amylacetylene, ethyl-n-butylacetylene, di-n-butylacetylene, methylhexadecylacetylene, dipropylacetylene, dihexadecylacetylene, dicyclohexylacetylene, dinaphthylacetylene, and the like.

The second reactant employed in this invention comprises at least one organometal compound having the general formula: $MeR'_n$ wherein Me is a metal selected from the group consisting of aluminum, gallium, indium, thallium, and beryllium, R' is an alkyl, cycloalkyl or aryl group containing from 1 to 30 carbon atoms, and $n$ is an integer equivalent to the valence of Me. Examples of suitable organometal compounds include trimethylaluminum, triethylaluminum, tributylaluminum, triamylaluminum, tridecylaluminum, trieicosylaluminum, tritricontylaluminum, and their gallium, indium, thallium, and beryllium analogues.

It is obvious to one skilled in the art that minor quantities of impurities may be contained in the reactants so long as the impurities do not have a deleterious effect on the reaction.

The mechanism of the reaction between the disubstituted acetylenic compound and the organometal is not fully understood and it is not necessary to the utilization of this invention that any theory be expounded or explanation offered concerning this apparently complex interaction of chemical compounds. The reaction products obtained by the interaction of the aforementioned reactants comprise two related compounds: a tetrasubstituted butadiene and a related monoolefin. It is obvious to one skilled in the art that the particular reaction products depend on the particular reactants employed. However, it can be stated that the tetrasubstituted butadienes are compounds which can be represented by the following general formula:

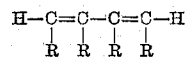

wherein R corresponds with the R in the disubstituted acetylene compounds as described hereinbefore.

The related monoolefin product consists of compounds having the following general formula:

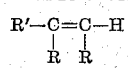

wherein R corresponds to the R in the disubstituted acetylene and the R' is a hydrocarbon group corresponding to the R' in the organometal compound hereinbefore described.

While the reaction can be initiated in the absence of a solvent, it is generally preferable to use an inert diluent as a reaction medium. It is particularly advantageous to use an inert diluent as a carrier for the organometal compounds since many are pyrophoric and are therefore somewhat dangerous to handle in the presence of oxygen. The diluent used for the carrier of the organometal compound can be the same diluent which is used as a reaction medium. Examples of suitable diluents include paraffinic hydrocarbons such as butane, pentane, hexane, heptane and octane or mixtures thereof, cycloparaffinic hydrocarbons such as cyclohexane or methylcyclohexane, or aromatic hydrocarbons such as benzene, toluene, xylene or the like. The amount of diluent employed is not critical and the optimum amount is readily determinable by routine experiment by one skilled in the art. Preferably, the amount of diluent employed as a carrier can be as high as 50 parts by weight per part of reactant or even higher.

The reaction conditions for the reaction of the disubstituted acetylenic compound with the organometal compound are variable over an extremely wide range. Preferably the temperature for the reaction is maintained in a range between −100 and 150° C., more preferably between about 60 and 120° C. The pressure is maintained at any convenient level to maintain the system in a liquid phase under reaction conditions when using a diluent. Preferably the pressure is between about atmospheric and about 1,000 p.s.i.g. or even higher.

The mole ratio of disubstituted acetylene to organometal compound can range from a major amount of the acetylenic compound to a minor amount of acetylenic compound, preferably the mole ratio of disubstituted acetylene to organometal compound will be in the range of from 0.01:1.0 to 3.0:1.0.

The period of time required for the reaction is, of course, a function of the particular reactants used and the reaction conditions employed. For instance, when employing a temperature in the range between about 60 and 120° C. at atmospheric pressure, it is preferable to continue the reaction for a period of time between about 5 and 150 hours, more preferably between about 20 and 100 hours.

At the termination of the reaction period the organometal compound is deactivated by treating the reaction mixture with a treating agent, such as water or alcohol. The amount of the treating agent is variable over a wide range but preferably is at least 3 moles per mole of organometal compound although a substantial excess can be used, for instance an amount in the range from 10 to 20 moles per mole of organometal compound, or even more.

Subsequent to deactivation of the organometal compound by the treating agent the products are separated from the reaction mixture. When the reactants comprise diphenyl acetylene and triethylaluminum the reaction products will comprise as the major components thereof tetraphenylbutadiene and alpha-ethyl-cis-stilbene. In this particular reaction the tetraphenylbutadiene is separable as a solid product while the stilbene is separable as a liquid. Any suitable means for separating these products from the reaction mixture can be used. One suitable means includes adding a small amount of water if water was not used in the treating agent, separating the mixture into an organic layer and a water layer due to the difference in specific gravity and then decanting the supernatant organic layer from the water layer. Solvent is then stripped from the organic layer by any suitable method, such as distillation, leaving a residue comprising a pale yellow oil and a white crystalline solid. The solid can then be separated by any suitable liquid-solid separation means, such as a filter, while the liquid which comprises the alpha-ethyl-cis-stilbene as the second product can be purified by any suitable means, such as distillation. In many of the reactions between these disubstituted acetylenic compounds and the organometals the desired products will be recovered as liquid-solid mixtures but when operating with certain reactants both products will be recovered as liquids which may be separated by any suitable means such as distillation. Since the principal products have widely different molecular weights such procedures are readily operable.

The apparatus used to contain the reactants and reaction mixture may be any suitable apparatus known to the art.

Both of the major products of this invention are useful as adjuvants in the polymerization of olefins, such as propylene, to improve the isotactic content when using certain initiator systems. For instance, when polymerizing propylene with an initiator system comprising triethylaluminum and titanium trichloride it has been found that the use of the adjuvants of this invention increase the isotactic content, as determined as hereinafter described, of the polypropylene from approximately 79 percent to 88 percent when using alpha-ethyl-cis-stilbene and from 79 percent to approximately 86 percent when using tetraphenylbutadiene.

The isotactic content of each product was determined by placing 2.5±0.1 grams of polymer in a weighted extraction thimble and extracting in an ASTM rubber extraction apparatus for 2.5 hours with 100 ml. of boiling normal heptane at one atmospheric pressure. The thimble was then removed and dried in a forced air oven at 110° C. for 2 hours after which it was cooled in a desiccator and weighed. The weight percent of residue based on original polymer, was calculated and recorded as isotactic content.

A more complete understanding of the invention can be obtained by referring to the following examples which are not intended, however, to be unduly limitative of the invention.

Example 1

To a glass lined reaction vessel was added 3.56 grams of diphenyl acetylene and 40 ml. of a 1.58 molar solution of triethylaluminum in cyclohexane. The mixture was heated at 87° C. for 24 hours after which it was allowed to stand at room temperature for several hours. Ten ml. of ethanol was then added, followed by a small amount of water and cyclohexane. The organic liquid phase was separated, washed with water and dried over magnesium sulfate. The magnesium sulfate was removed on a filter and the solvent removed under vacuum at about 55° C. The remaining material consisted of a solid and a pale yellow oil which was separated on a filter and the solid washed with ethanol with the wash liquid added to the oil. The yield of solid was 0.32 gram. A portion of this solid was recrystallized from ethanol and cyclohexane to yield a white crystalline (needles) product melting at 181–182° C. (corrected value). Analysis for carbon and hydrogen and molecular weight determination compared with calculated values for tetraphenylbutadiene ($C_{28}H_{22}$) gave the following values:

|  | Found | Calculated |
|---|---|---|
| Carbon ................................. percent .. | 93.5 | 98.3 |
| Hydrogen ................................. do .. | 5.7 | 6.2 |
| Molecular Weight (Rast Camphor method) ... | 348 | 358 |

The filtrate was stripped of ethanol and distilled to provide 2.336 grams of a pale yellow liquid boiling at 82° C. under 0.06 mm. Hg. Analysis of this product gave the following values:

|  | Found | Calculated for $C_{16}H_{16}$ |
|---|---|---|
| Molecular Weight [1] | 203 | 208 |
| Carbon (percent) | 92.0 | 92.3 |
| Hydrogen (percent) | 7.9 | 7.7 |

[1] Found by boiling point elevation of benzene examination by ultraviolet light indicated cis-structure.

This example shows that the solid product from the reaction of diphenyl acetylene and triethylaluminum is tetraphenylbutadiene and the liquid is alpha-ethyl-cis-stilbene.

Example II

To a glass lined reaction vessel was charged 3.56 grams of diphenyl acetylene and 7.3 grams of triethylaluminum (1.58 molar solution in cyclohexane). The mixture was heated at 83.8° C. for 39 hours. After cooling to room temperature, 10 ml. ethanol was added followed by small amounts of water and cyclohexane. The organic liquid phase was then separated by decantation, washed with water and dried over magnesium sulfate, after which the solvent was removed by heating at about 55° C. under vacuum, leaving a pale yellow oil containing a solid precipitate. This solid was removed on a filter, washed with ethanol and dried to provide 0.340 grams of white crystalline tetraphenylbutadiene as product.

The wash liquid and oily filtrate were combined, the ethanol stripped, and the oil distilled to provide 2.1754 grams of a pale yellow liquid identified as alpha-ethyl-cis-stilbene. This liquid had an index of refraction, $n_D^{20}$, of 1.5948 and a specific gravity (24/4° C. of 0.983).

A sample of the liquid product was studied by nuclear magnetic resonance and from the spectrum obtained the presence of an ethyl group, vinyl hydrogen, and phenyl hydrogen was indicated. Examination by ultraviolet light indicated cis-structure.

This example shows further confirmation that the liquid product from the reaction of diphenyl acetylene with triethylaluminum is alpha-ethyl-cis-stilbene.

Example III

A run is made in the manner described in Example II, using 20 moles of dimethylacetylene and 20 moles of triisobutylaluminum. The reaction temperature of 100° C. is maintained for 24 hours. Recovery, effected as previously described, provides tetramethylbutadiene and 3-methyl-2-heptene.

Example IV

In another run made according to the procedure of Example II 25 moles of diethylacetylene is reacted with 30 moles of triethylgallium at 60° C. for a period of 60 hours. Recovery is effected as described in Example II to yield tetraethylbutadiene and 3-ethyl-3-hexene.

While certain examples, structures, composition and process steps have been described for purposes of illustration, the invention is not limited to these. Variation and modification within the scope of the disclosure and the claims can readily be effected by those skilled in the art.

What we claim is:

1. A process for preparing a tetrasubstituted conjugated diene and a related olefin which comprises contacting a disubstituted acetylenic compound with a material consisting essentially of an organometal compound, said disubstituted acetylenic compound being represented by the following formula: R—C≡C—R wherein R is selected from the group consisting of an alkyl, cycloalkyl and aryl group and the total number of carbons in the R groups is between 2 and 32, said organometal compound having the following formula: MeR′$_n$ where Me is a metal selected from the group consisting of aluminum, gallium, indium, thallium, and beryllium, R′ is selected from the group consisting of an alkyl, cycloalkyl and aryl group containing from 1 to 30 carbon atoms, n is an integer equivalent to the valence of Me, said contacting occurring at a temperature in the range of −100 to 150° C. and at a pressure sufficient to maintain the system in a liquid phase, and recovering as products a tetrasubstituted conjugated diene and a related olefin.

2. The process of claim 1 wherein said organometal compound is triethylaluminum.

3. The process of claim 1 wherein said acetylenic compound is diphenyl acetylene and said tetrasubstituted butadiene is 1,2,3,4-tetraphenylbutadiene.

4. The process of claim 1 wherein said organometal compound is triethylaluminum and said related olefin is alpha-ethyl-cis-stilbene.

5. A process for preparing a tetrasubstituted butadiene and a related olefin which comprises contacting a disubstituted acetylenic compound with a material consisting essentially of an organometal compound, said disubstituted acetylenic compound being represented by the following formula: R—C≡C—R wherein R is selected from the group consisting of an alkyl, cycloalkyl and aryl group and the total number of carbons in the R groups is between 2 and 32, said organometal compound having the following formula: MeR′$_n$ wherein Me is a metal selected from the group consisting of aluminum, gallium, indium, thallium, and beryllium, R′ is selected from the group consisting of an alkyl, cycloalkyl and aryl group having from 1 to 30 carbon atoms per molecule, and n is an integer equivalent to the valence of Me, said contacting occurring at a temperature in the range of −100 to 150° C. and at a pressure sufficient to maintain the system in a liquid phase, thereafter treating the reaction mixture with a material to deactivate the organometal compound, and recovering as products a tetrasubstituted butadiene and a related olefin.

6. The process of claim 5 wherein said acetylenic compound is diphenyl acetylene and said tetrasubstituted butadiene is 1,2,3,4-tetraphenylbutadiene.

7. The process of claim 6 wherein said organometal compound is triethylaluminum and said related olefin is alpha-ethyl-cis-stilbene.

8. A process for preparing a tetrasubstituted butadiene and a related olefin which comprises contacting in a reaction zone a disubstituted acetylenic compound with a material consisting essentially of an organometal compound with a mole ratio of disubstituted acetylenic compound to organometal compound in the range from 0.01:1.0 to 3.0:1.0, said disubstituted acetylenic compound being represented by the following formula:

wherein R is selected from the group consisting of an alkyl, cycloalkyl and aryl group and the total number of carbons in the R groups is between 2 and 32, said organometal compound having the following formula: MeR′$_n$ wherein Me is a metal selected from the group consisting of aluminum, gallium, indium, thallium, and beryllium, R′ is selected from the group consisting of an alkyl, cycloalkyl and aryl group having from 1 to 30 carbon atoms per molecule, and n is an integer equivalent to the valence of Me, said reaction taking place in an inert hydrocarbon diluent, said reaction zone maintained at a temperature in the range of between −100 and 150° C. and a pressure sufficient to maintain the system in a liquid phase, continuing the reaction for a period of time in the range from 5 to 150 hours, thereafter treating the reaction mixture with a material selected from the group consisting of water and alcohol to deactivate the organometal compound and recovering as products a tetrasubstituted butadiene and a related olefin.

9. The process of claim 8 wherein said acetylenic compound is diphenyl acetylene and said tetrasubstituted butadiene is 1,2,3,4-tetraphenylbutadiene.

10. The process of claim 9 wherein said organometal compound is triethylaluminum and said related olefin is alpha-ethyl-cis-stilbene.

11. The process of claim 8 wherein said acetylenic compound is dimethylacetylene, said organometal compound is triisobutylaluminum and said products comprise tetramethylbutadiene and 3-methyl-2-heptene.

12. The process of claim 8 wherein said acetylenic compound is diethylacetylene, said organometal compound is triethylgallium and said products comprise tetraethylbutadiene and 3-ethyl-3-hexene.

13. A process for preparing tetraphenylbutadiene and alpha-ethyl-cis-stilbene which comprises contacting in a reaction zone diphenyl acetylene with a material consisting essentially of triethylaluminum, said triethylaluminum being introduced into said reaction zone as a solute in cyclohexane, said ratio of diphenyl acetylene to triethylaluminum being in the range of between 0.1:1.0 to 3.0:1.0, said reaction zone being maintained at a temperature in the range of between about 60 and 120° C. and a pressure sufficient to maintain the system in a liquid phase, continuing the reaction for a period of time in the range of between about 5 to 150 hours, thereafter treating said reaction mixture with at least 3 moles of ethanol per mole of triethylaluminum to deactivate said triethylaluminum, and recovering as products tetraphenylbutadiene and alpha-ethyl-cis-stilbene.

References Cited in the file of this patent

UNITED STATES PATENTS

| 2,613,231 | Canale et al. | Oct. 7, 1952 |
| 2,721,189 | Anderson et al. | Oct. 18, 1955 |

FOREIGN PATENTS

| 538,782 | Belgium | Dec. 6, 1955 |